US008170379B2

(12) United States Patent
Shiiyama et al.

(10) Patent No.: US 8,170,379 B2
(45) Date of Patent: May 1, 2012

(54) IMAGE PROCESSING APPARATUS AND IMAGE RETRIEVAL METHOD

(75) Inventors: Hirotaka Shiiyama, Yokohama (JP); Masahiro Matsushita, Yokohama (JP); Hidetomo Sohma, Yokohama (JP); Tomomi Takata, Yokohama (JP); Koichi Magai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 869 days.

(21) Appl. No.: 12/106,197

(22) Filed: Apr. 18, 2008

(65) Prior Publication Data

US 2008/0285855 A1 Nov. 20, 2008

(30) Foreign Application Priority Data

May 16, 2007 (JP) ................................ 2007-130901

(51) Int. Cl.
*G06K 9/60* (2006.01)
*G06K 9/46* (2006.01)
(52) U.S. Cl. ........................................ 382/305; 382/190
(58) Field of Classification Search .................. 382/305, 382/190
See application file for complete search history.

(56) References Cited

U.S. PATENT DOCUMENTS

| 6,493,705 | B1 | 12/2002 | Kobayashi et al. ............... 707/3 |
| 6,856,987 | B2 | 2/2005 | Kobayashi et al. ............... 707/6 |
| 7,051,048 | B2 | 5/2006 | Sohma et al. ................. 707/200 |
| 7,054,861 | B2 | 5/2006 | Kobayashi et al. ............... 707/6 |
| 7,075,683 | B1 | 7/2006 | Shiiyama ..................... 358/452 |
| 7,127,106 | B1* | 10/2006 | Neil et al. ..................... 382/181 |
| 7,233,945 | B2 | 6/2007 | Shiiyama ......................... 707/4 |
| 7,847,823 | B2* | 12/2010 | Habuka et al. .............. 348/208.4 |
| 2005/0036712 | A1 | 2/2005 | Wada |
| 2006/0110073 | A1 | 5/2006 | Matsushita et al. ........... 382/305 |
| 2006/0112088 | A1 | 5/2006 | Kobayashi et al. ............... 707/3 |
| 2006/0120627 | A1 | 6/2006 | Shiiyama ..................... 382/305 |
| 2006/0122986 | A1 | 6/2006 | Sohma ............................. 707/3 |
| 2006/0164702 | A1 | 7/2006 | Shiiyama ..................... 358/537 |
| 2006/0274081 | A1 | 12/2006 | Matsushita ................... 345/589 |
| 2007/0122037 | A1 | 5/2007 | Shiiyama ..................... 382/190 |
| 2007/0143272 | A1* | 6/2007 | Kobayashi ....................... 707/3 |
| 2007/0253623 | A1* | 11/2007 | Ohira et al. .................... 382/218 |

(Continued)

FOREIGN PATENT DOCUMENTS

CN 1588425 A 3/2005

(Continued)

OTHER PUBLICATIONS

Zhang et al. "Content-Based Image Retrieval Using Gabor Texture Features" IEEE PAMI, 2000, pp. 13-15.*

(Continued)

*Primary Examiner* — Bhavesh Mehta
*Assistant Examiner* — Utpal Shah
(74) *Attorney, Agent, or Firm* — Fitzpatrick, Cella, Harper & Scinto

(57) ABSTRACT

A plurality of feature points are extracted from an inputted image, and a feature amount is computed with regard to the feature point thus extracted. A prescribed plurality of alterations, i.e., a rotation, an enlargement, or a reduction, are applied to the inputted image, a plurality of altered feature amounts are estimated with regard to the feature point, and an image is retrieved from among stored images that are stored upon a storage apparatus and that is most similar to the inputted image, in accordance with the plurality of the estimated altered feature amounts.

8 Claims, 11 Drawing Sheets

U.S. PATENT DOCUMENTS

| | | | |
|---|---|---|---|
| 2008/0089615 A1 | 4/2008 | Shiiyama | 382/305 |
| 2008/0104011 A1* | 5/2008 | Shibasaki et al. | 707/1 |
| 2008/0177764 A1* | 7/2008 | Kise et al. | 707/100 |
| 2009/0041340 A1 | 2/2009 | Suzuki et al. | |

FOREIGN PATENT DOCUMENTS

| | | |
|---|---|---|
| JP | 08-249349 | 9/1996 |
| JP | 09-044665 | 2/1997 |
| JP | 2004334594 A | 11/2004 |
| JP | 2005275634 A | 10/2005 |
| JP | 2006-065399 | 3/2006 |
| JP | 2006146737 A | 6/2006 |
| WO | 2006073076 A1 | 7/2006 |
| WO | 2006092957 A1 | 9/2006 |

OTHER PUBLICATIONS

Chinese Office Action dated Feb. 12, 2010 in corresponding Chinese Application No. 2008100818838, and English language translation thereof.

C. Schmid and R. Mohr, "Local grayvalue invariants for image retrieval," IEEE Trans. PAMI., vol. 19, No. 5, pp. 530-535, 1997.

C. Harris and M. J. Stephens, "A combined corner and edge detector," in Alvey Vision Conference, pp. 147-151, 1988.

J. J. Koenderink and A. J. van Doorn, "Representation of local geometry in the visual system," Biological Cybernetics, vol. 55, pp. 367-375, 1987.

U.S. Appl. No. 12/058,435 (Koichi Magai), pending.

U.S. Appl. No. 12/116,133 (Hidetomo Sohma, et al), pending.

Kanazawa, Y et al, "Do we really have to consider covariance matrices for image features?", Proceedings of the Eight IEEE International Conference on Computer Vision, vol. 2, Jul. 7, 2001.

Steele R. M. et al, "Feature Uncertainty Arising from Covariant Image Noise", Computer Vision and Pattern Recognition, 2005 IEEE Computer Society Conference, vol. 1, Jun. 20, 2005.

Zeisl, "Estimation of Location Uncertainty for Scale Invariant Feature Points", British Machine Vision Conference, Sep. 7, 2009.

European Search Report dated Sep. 23, 2011 in corresponding European Application No. 08156254.8.

Tsagaan, et al., "Development of Extraction Method of Kidneys from Abdominal CT Images Using a Three-Dimensional Deformable Model", The Transactions of the Institute of Electronics, Information and Communication Engineers, Jan. 1, 2002.

Japanese Office Action dated Dec. 2, 2011 in corresponding Japanese Patent Application 2007-130901.

Japanese Office Action dated Aug. 26, 2011 in corresponding Japanese Application No. 2007-130901.

* cited by examiner

IMAGE PROCESSING APPARATUS AND IMAGE RETRIEVAL METHOD

BACKGROUND OF THE INVENTION

1. Field of the Invention

The present invention relates to an image processing apparatus and an image retrieval method that retrieves a similar image in accordance with a degree of similarity of a feature point that is within the image.

2. Description of the Related Art

Conventionally, a retrieval that supports a rotation of an image performs a retrieval by employing either a technique of rotating a query image and deriving a feature amount, or else a technique of making a rotational transformation of the feature amount. A technology also exists that takes into account a distribution for a normalizing a value of each respective feature amount with regard to a learning image, i.e., a sample image wherein the distribution of the value of the feature amount is checked, and a matching is performed that employs a Bayes' distance or a Mahalanobis distance.

Such a technology, however, involves the feature amount distribution being normalized with regard to the learning image as an ideal of a registered image, and does not take into account that the feature amount thus calculated may experience a discrepancy as a result of a image process, such as a rotation, an enlargement, or a reduction, of a query image. As a consequence, a distance from one feature amount to another feature amount for a purpose of computing a degree of similarity is not accurately computed, and a discrepancy arises therefrom.

Japanese Patent Laid Open No. 2006-065399 discloses an image retrieval technology in accordance with the degree of similarity of a feature point within the image. The technology involves making a sorting selection of the feature point and the feature amount that is registered with an image process lexicon using a prepared model image for learning. After the feature point and the feature amount are extracted from the image for learning, the feature point and the feature amount thus extracted is compared with the feature point and the feature amount of the learning model image. A feature amount that has a maximum number of instances wherein it is determined to correspond thereto is thereby registered in the lexicon as a feature amount that is employed in the recognition process thereof.

An extraction of the feature point and the feature amount is performed after performing a multiple resolution or a rotation transformation, and the feature point and the feature amount thus extracted is made into an index with a tree structure that allows a lexicon for recognition to be easily built. A specific description from a viewpoint of robustness as relates to the enlargement or the reduction of the image, a degree of distribution of the feature amount or a rotation of the feature point of the query image itself, however, is lacking.

Conversely, according to C. Schmid and R. Mohr, "Local grayvalue invariants for image retrieval," IEEE Trans. PAMI., Vol. 19, No. 5, pp. 530-535, 1997 (hereinafter "Cited Reference 1"), a detection of the feature point is performed, the feature amount is calculated that incorporates a property of a plurality of resolutions that will be invariant under the rotation, and a feature point thereof wherein a value is a maximum is adopted as being a robust feature. The comparison with the query image employs the Mahalanobis distance that takes into account the distribution of the feature amount of the registered image, and thereby mitigates the problem of a bias in a multidimensional feature amount distribution.

The feature amount that is defined as incorporating the property of being invariant under the rotation, however, does actually incur a fluctuation thereunder as a result of a noise of such as a linear interpolation that is carried out when rotation processing the image. FIG. 8 depicts an instance of the fluctuation that actually occurs in the feature amount that is defined as incorporating the property of being invariant under the rotation, wherein is depicted the fluctuation thereunder of a zeroth component and a first component of the feature amount when rotated in 15-degree increments from zero to 90 degrees. As can be seen in FIG. 8, the feature amount that is defined as incorporating the property of being invariant under the rotation does, in fact, fluctuate thereunder. A problem arises wherein a precision of the retrieval declines as a consequence of the problem of the feature amount that is supposed to be invariant fluctuating thereunder in actuality.

The problems occurs because the distribution of the multidimensional feature amount of the registered feature amount is only normalized by the Mahalanobis distance, and the discrepancy of the distribution of the feature point of the query image that arises from the enlargement, the reduction, or the rotation thereof is not taken into account. The feature amount that is defined as incorporating the property of being invariant under the rotation while, in fact, fluctuating thereunder, will be treated hereinafter as a local feature amount. A point that includes the local feature amount will be treated hereinafter as a local feature point.

As per the preceding description, the discrepancy that occurs as a result of the rotation, the reduction, or the rotation of the query itself of the query image proper is not taken into account under the conventional technology, and thus, a calculation of the degree of similarity of a image and another image cannot be said to include a high degree of precision.

SUMMARY OF THE INVENTION

The present invention can derive a distribution of a feature amount with regard to local feature point of a image, and calculate a degree of similarity of the image in accordance with a distance between each respective distributed feature point.

According to one aspect of the present invention, there is provided an image processing apparatus, comprises: an extraction unit operable to extract a plurality of feature points from an inputted image; a feature amount computation unit configured to compute respective feature amounts for the plurality of feature points; an estimation unit configured to estimate respective fluctuation feature amounts for the plurality of feature points in a case where a prescribed plurality of alterations is applied to the inputted image; and a retrieval unit operable to retrieve an image similar to the inputted image from among a plurality of stored images, based on the fluctuation feature amounts estimated by the estimation unit.

According to another aspect of the present invention, there is provided an image retrieval method, comprises: extracting a plurality of feature points from an inputted image; computing respective feature amounts for the plurality of feature points; estimating respective fluctuation feature amounts in the plurality of feature points in a case where a prescribed plurality of alterations is applied to the inputted image; and retrieving an image similar to the inputted image from among a plurality of images stored in a storage device, based on the fluctuation feature amounts estimated in the estimation.

Further features of the present invention will become apparent from the following description of exemplary embodiments, with reference to the attached drawings.

DESCRIPTION OF THE EMBODIMENTS

Following is a detailed description of preferred embodiments of the present invention, with reference to the attached drawings.

First Embodiment

Figure 1:
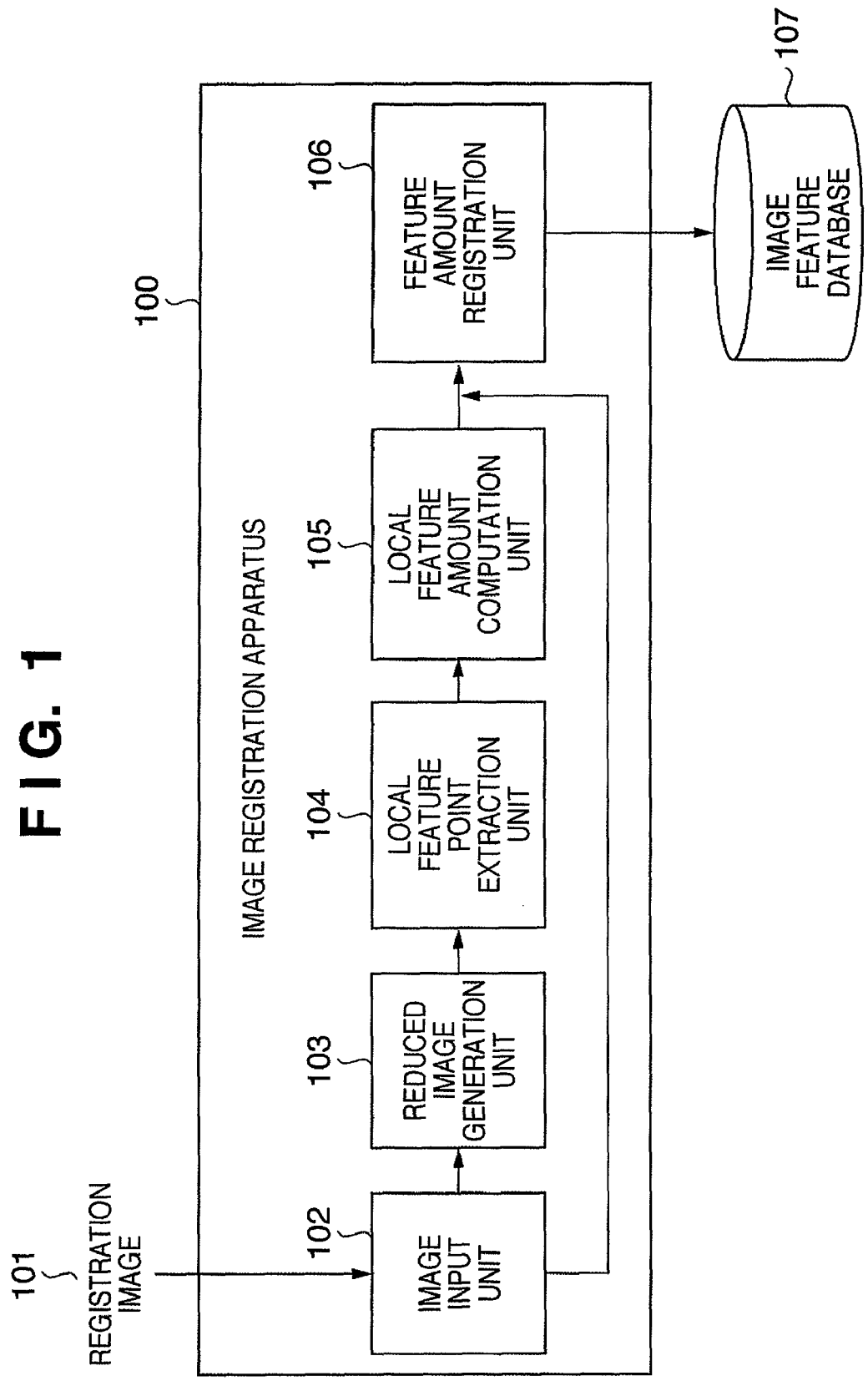
FIG. 1 is a block diagram that depicts a configuration of an image registration apparatus according to a first embodiment.

FIG. 1 is a block diagram that depicts an image registration apparatus according to a first embodiment. As depicted in FIG. 1, an image registration apparatus 100 is configured from an image input unit 102, a reduced image generation unit 103, a local feature point extraction unit 104, a local feature amount computation unit 105, and a feature amount registration unit 106.

With regard to the image registration apparatus 100, the reduced image generation unit 103 generates a reduced image of a registration image 101 that is inputted into the image input unit 102, and the local feature point extraction unit 104 extracts a local feature point from the reduced image thus generated. The local feature amount computation unit 105 computes a local feature amount of the local feature point thus extracted, and the feature amount registration unit 106 associates the registration image 101 with the local feature amount thus computed, and registers the registration image 101 and the local feature amount thus associated in a image feature database 107. A description of a process of registering the image that is executed with the image registration apparatus 100 will be provided later.

Figure 2:
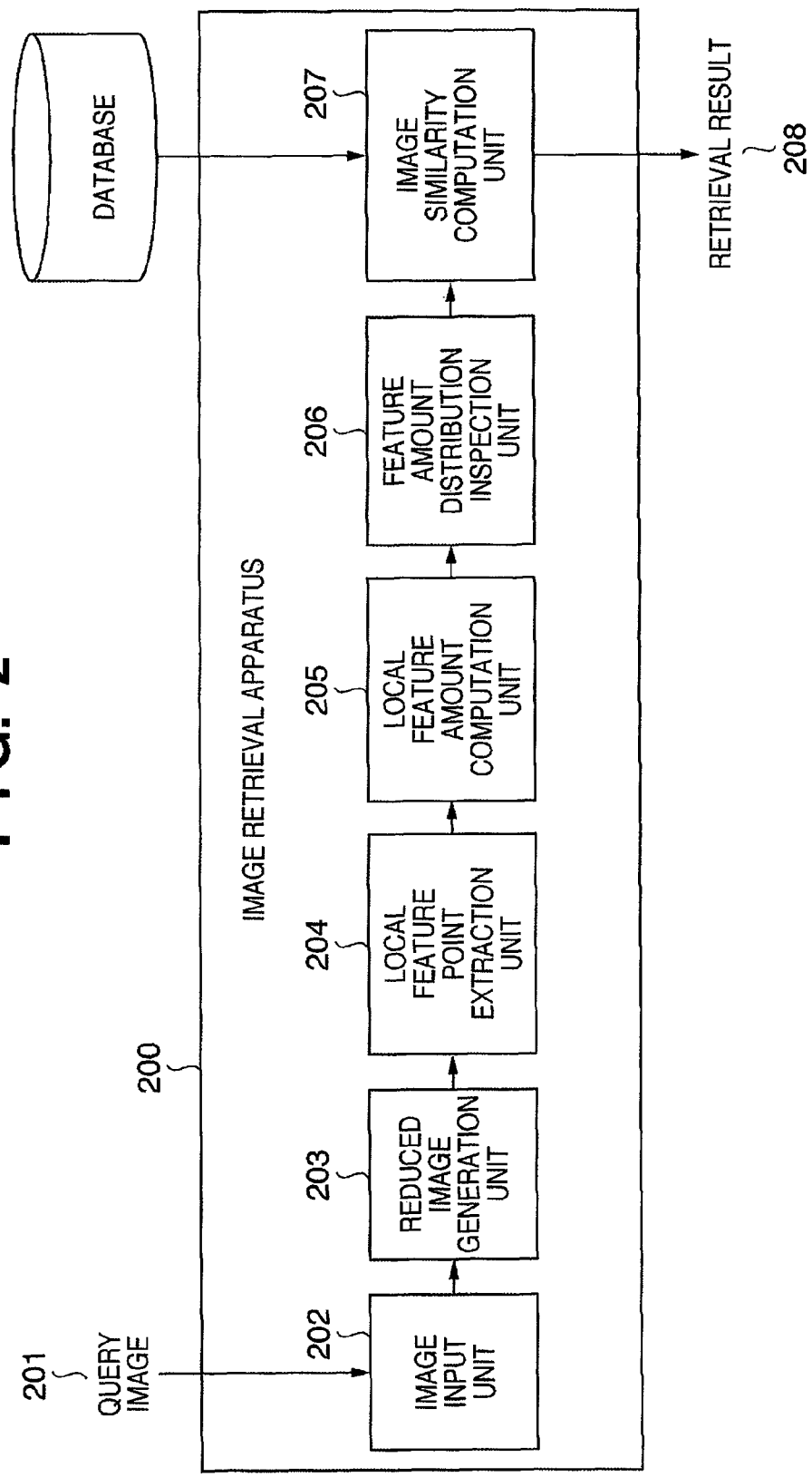
FIG. 2 is a block diagram that depicts a configuration of an image retrieval apparatus according to the first embodiment.

FIG. 2 is a block diagram that depicts an instance of a configuration of an image retrieval apparatus according to the first embodiment. As depicted in FIG. 2, an image retrieval apparatus 200 is configured from an image input unit 202, a reduced image generation unit 203, a local feature point extraction unit 204, a local feature amount computation unit 205, a feature amount distribution inspection unit 206, and an image degree of similarity computation unit 207.

With regard to the image retrieval apparatus 200, the reduced image generation unit 203 generates a reduced image of a query image 201 that is inputted into the image input unit 202, and the local feature point extraction unit 204 extracts a local feature point from the reduced image thus generated. The local feature amount computation unit 205 computes a local feature amount of the local feature point thus extracted, and the feature amount distribution inspection unit 206 inspects the local feature amount thus computed. A result of the inspection is passed to the image degree of similarity computation unit 207, the image degree of similarity computation unit 207 retrieves a image from the image feature database 107 that is similar to the query image 201, in accordance with the result of the inspection that is performed by the feature amount distribution inspection unit 206, and outputs the image thus retrieved as a retrieval result 208. A description of a process of retrieving the image that is executed with the image retrieval apparatus 200 will be provided later.

Image Registration Process

Figure 3:
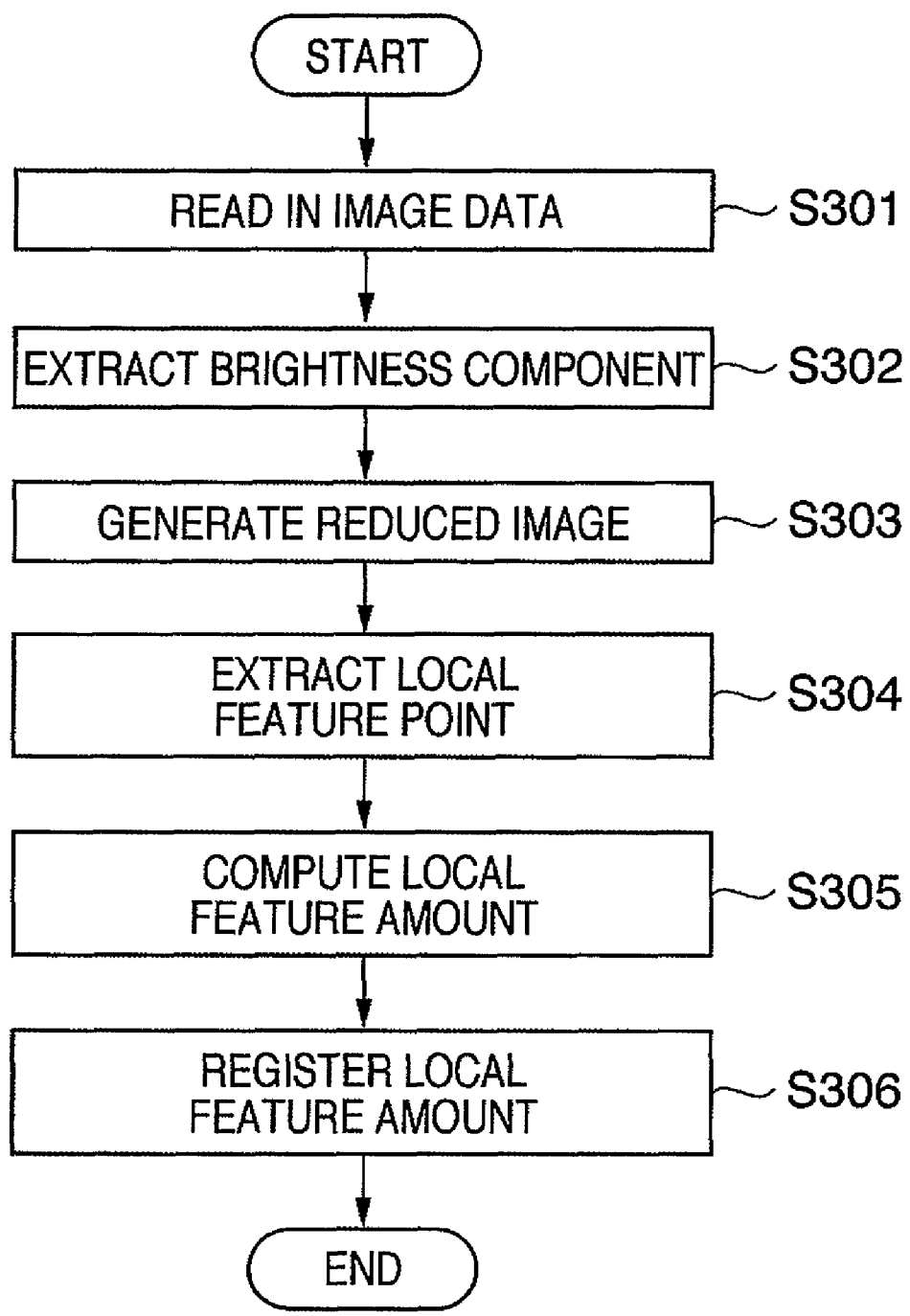
FIG. 3 is a flowchart that represents a process of registering an image.

FIG. 3 is a flowchart that represents a sequence of a process of registering the image. In step S301, the image input unit 102 reads in the registration image 101, as depicted in FIG. 1, and a brightness component is extracted from the registration image 101 in step S302. A brightness component image is generated in accordance with the brightness component thus extracted, and the brightness component image thus generated is passed to the reduced image generation unit 103. The registration image 101 is also passed to the feature amount registration unit 106.

In step S303, the reduced image generation unit 103 reduces the brightness component image that is passed to the reduced image generation unit 103 from the image input unit 102, in a series of stages according to a proportion p, thereby generating a number of the reduced image n, and passing the reduced image to the local feature point extraction unit 104. It is to be understood that both the proportion p and the number of the reduced image n are predetermined, and may be selectable in advance.

Figure 4:
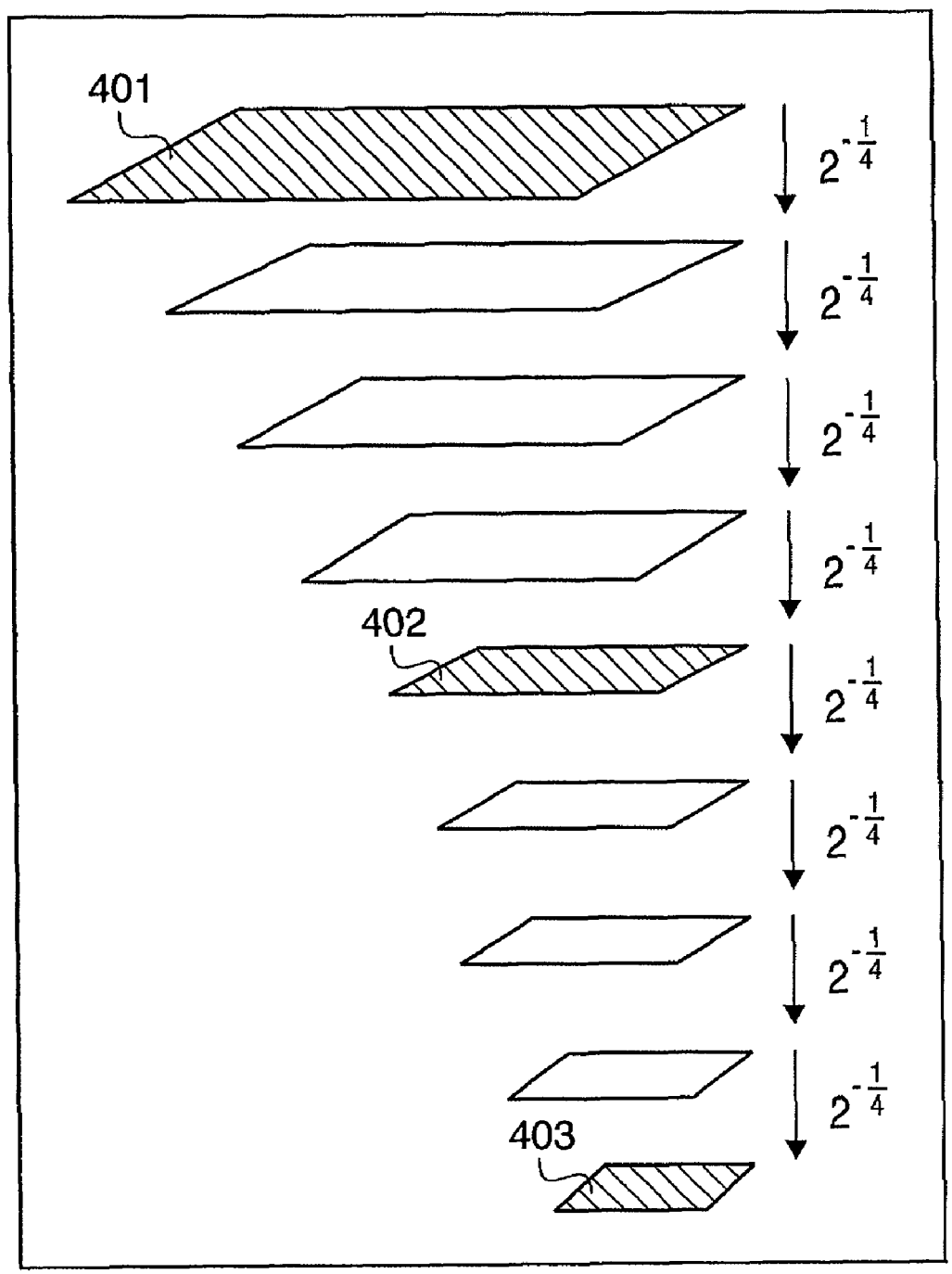
FIG. 4 depicts a process of a reduced image generation unit 103 that generates a reduced image.

FIG. 4 depicts the process of the reduced image generation unit 103 that generates the reduced image. The example that is depicted in FIG. 4 is where the proportion p is 2 to the power of −¼, and the number of the reduced image n is nine. With regard to FIG. 4, reference numeral 401 is the brightness component image that is passed to the reduced image generation unit 103 from the image input unit 102. Reference numeral 402 is a reduced image that has been reduced four times from the brightness component image, according to the proportion p. Reference numeral 403 is a reduced image that has been reduced eight times from the brightness component image, according to the proportion p.

In the present example, the reduced image 402 is a image that has been reduced to one-half of the brightness component image that is passed to the reduced image generation unit 103 from the image input unit 102, and the reduced image 403 is a image that has been reduced to one-fourth of the brightness component image that is passed to the reduced image generation unit 103 from the image input unit 102. Any method of reducing the image would be permissible, and it is presumed that the reduced image is generated by a reduction method of a linear interpolation, according to the first embodiment.

In step S304, the local feature point extraction unit 104 extracts a localized feature point, i.e., a local feature point, from the reduced image series n that is passed to the local feature point extraction unit 104 from the reduced image generation unit 103, which may be extracted robustly even if each respective image undergoes a rotation. In the present example, a robust local feature point refers to a local feature point that may be extracted without experiencing significant loss of stability when the image is subjected to a rotation process. The local feature point thus extracted is passed to the local feature amount computation unit 105. A Harris operator is employed as the method of extracting the feature point according to the first embodiment; for reference, refer to C. Harris and M. J. Stephens, "A combined corner and edge detector", in Alvey Vision Conference, pp. 147-151, 1988.

With regard to a pixel in an output image H that is obtained by operating the Harris operator, the pixel in the image is checked for a pixel value of the pixel and of each of eight pixels in the immediate vicinity of the pixel, for a total of nine pixels, for instance. A point of the pixel that becomes a local maximum, i.e., wherein the pixel value of the pixel becomes a largest value among the nine pixels, is extracted as the local feature point. In the present circumstance, the pixel is not extracted as the local feature point, even if the pixel is the local maximum, when the value of the pixel is less than or equal to a threshold value. The pixel value refers to a value that denotes a degree to which each respective pixel is suitable as a locality thereof.

It is to be understood that the feature point extraction method is not restricted to the feature point extraction by the Harris operator, provided that a method is capable of extracting the local feature point, and it would be possible to apply another feature point extraction method to the local feature point extraction unit 104.

In step S305, the local feature amount computation unit 105 computes the local feature amount of the local feature point that is passed to the local feature amount computation unit 105 from the local feature point extraction unit 104. The local feature amount that is extracted in the present circumstance is passed to the feature amount registration unit 106 after being associated with coordinate information. As a method of computing the local feature amount, a combination of a Local Jet and a derivative function thereof is employed, according to the first embodiment. For reference, refer to J. J. Koenderink and A. J. van Doorn, "Representation of local geometry in the visual system", Biological Cybernetics, vol. 55, pp. 367-375, 1987.

Specifically, the local feature amount is computed via equation (1):

$$v = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \quad (1)$$

It is to be understood that a symbol at a right hand side of the equation (1) is defined in equations (2) to (7), shown in the next paragraph. In the present example, a G(x, y) at the right hand side of equation (2) is a Gaussian function, I(x, y) is a pixel value with regard to a coordinate (x, y) of the image, and "*" is a symbol that represents a convolution calculation. Equation (3) is a partial derivative that relates to a variable Lx that is defined in equation (2), and equation (4) is a partial derivative that relates to the variable Ly. Equation (5) is a partial derivative that relates to a variable Lxy that is defined in equation (3), equation (6) is a partial derivative that relates to a variable Lxx that is defined in equation (3), and equation (7) is a partial derivative that relates to a variable Lyy that is defined in equation (4).

$$L = G(x, y) * I(x, y) \quad (2)$$

$$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{xx} = \frac{\partial^2 L}{\partial x^2} \quad (6)$$

$$L_{yy} = \frac{\partial^2 L}{\partial y^2} \quad (7)$$

It is to be understood that the method of computing the feature amount is not restricted to the method described herein, provided that the method is capable of computing the local feature amount.

In step S306, the feature amount registration unit 106 associates the local feature amount that is passed to the feature amount registration unit 106 from the local feature amount computation unit 105 with the registration image 101 that is passed to the feature amount registration unit 106 from the image input unit 102, and registers the information thus associated in the image feature database 107. The process of registering the image is thereby completed.

Image Retrieval Process

Figure 5:
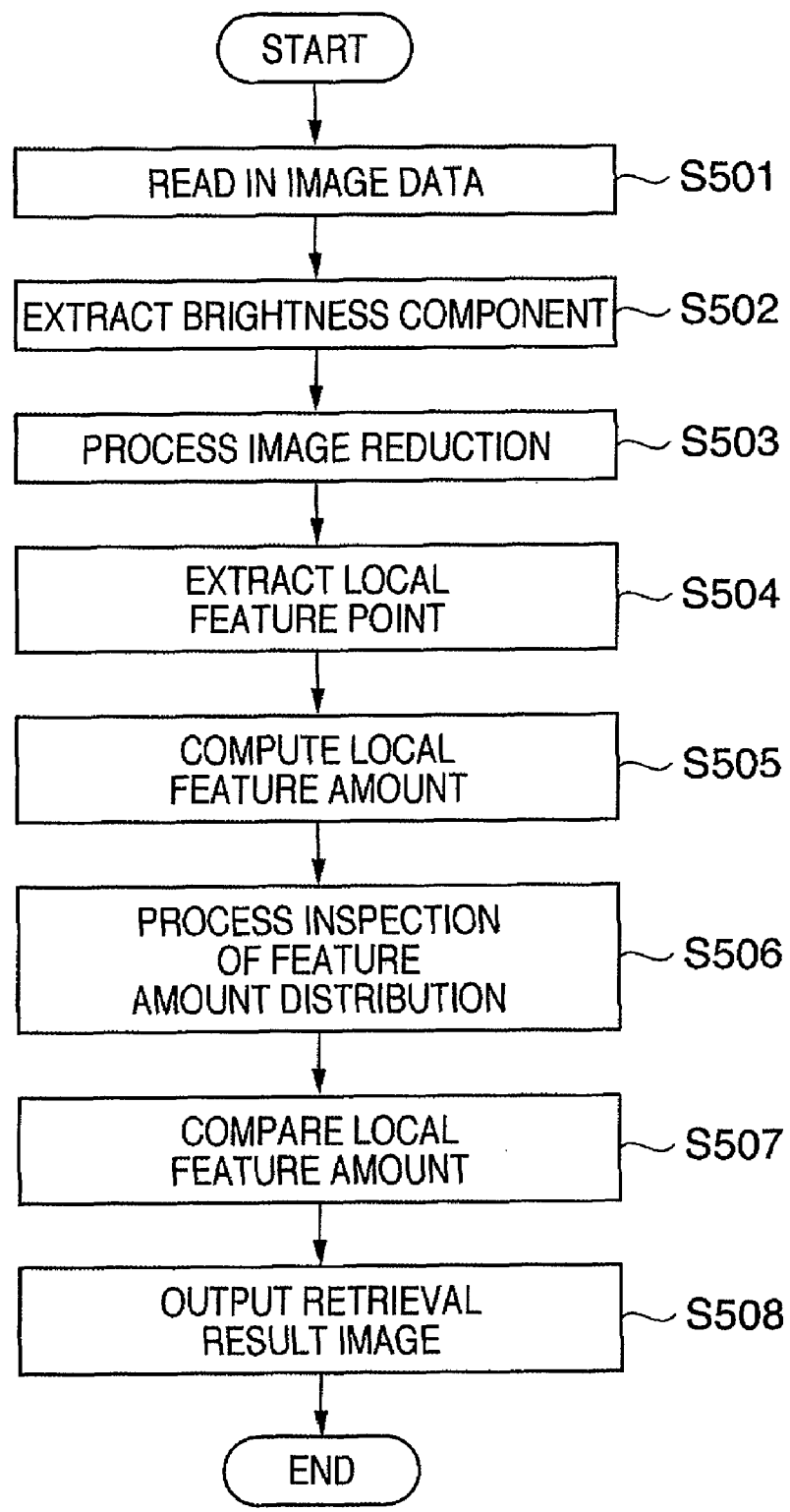
FIG. 5 is a flowchart that represents a process of retrieving a image.

FIG. 5 is a flowchart that represents a sequence of a process of retrieving the image. In step S501, the image input unit 202 reads in the query image 201 that is depicted in FIG. 2, and a brightness component is extracted from the query image 201 in step S502. A brightness component image is generated in accordance with the brightness component thus extracted, and the brightness component image thus generated is passed to the reduced image generation unit 203.

In step S503, the reduced image generation unit 203 reduces the brightness component image that is passed to the reduced image generation unit 203 from the image input unit 202, in a series of stages according to a proportion p, thereby generating a number of the reduced image n, and passing the reduced image to the local feature point extraction unit 204. It is to be understood that a value of both the proportion p and the number of the reduced image n is presumed to be the same value as the value that is employed as both the proportion p and the number of the reduced image n in the process of registering the image.

In step S504, the local feature point extraction unit 204 extracts each respective local feature point of the reduced image series n that is passed to the local feature point extraction unit 204 from the reduced image generation unit 203. The local feature point thus extracted is passed to the local feature amount computation unit 205. A Harris operator is employed as the method of extracting the feature point, similar to the method that is employed in the process of registering the image that is described herein.

Specifically, with regard to a pixel upon an output image H that is obtained by operating the Harris operator, the pixel in the image is checked for a pixel value of the pixel and of each of eight pixels in the immediate vicinity of the pixel, for a total of nine pixels. A point of the pixel that becomes a local maximum, i.e., wherein the pixel value of the pixel becomes a largest value among the nine pixels, is extracted as the local feature point. In the present circumstance, the pixel is not extracted as the local feature point, even if the pixel is the local maximum, when the value of the pixel is less than or equal to a threshold value.

It is to be understood that the feature point extraction method is not restricted to the feature point extraction by the Harris operator, provided that the method is capable of extracting the local feature point.

In step S505, the local feature amount computation unit 205 computes the local feature amount of each respective local feature point that is passed to the local feature amount computation unit 205 from the local feature point extraction unit 204. The local feature amount that is extracted in the present example is passed to the feature amount distribution inspection unit 206 after being associated with coordinate information. The method that is used herein to compute the local feature amount is the same method as that employed in the process of registering the image. Put another way, the combination of the Local Jet and the derivative function thereof is employed, and the local feature amount is computed via the equation (1).

In step S506, the feature amount distribution inspection unit 206 inspects a feature amount distribution with regard to each respective local feature amount that is passed to the feature amount distribution inspection unit 206 from the local feature amount computation unit 205, when the reduction process and the rotation transformation is performed thereupon. To simplify the following description, the local feature amount that is passed to the feature amount distribution inspection unit 206 from the local feature amount computation unit 205 will be exemplified by a fluctuation feature amount (zero degrees).

The feature amount distribution inspection according to the first embodiment performs the image rotation transformation on the reduced image that is generated in step S503 at an interval of 45 degrees, and computes the fluctuation feature amount with regard to the feature point after the rotation. The inspection is then conducted to determine an extent to which the feature amount has fluctuated as a consequence of the rotation.

Figure 8:
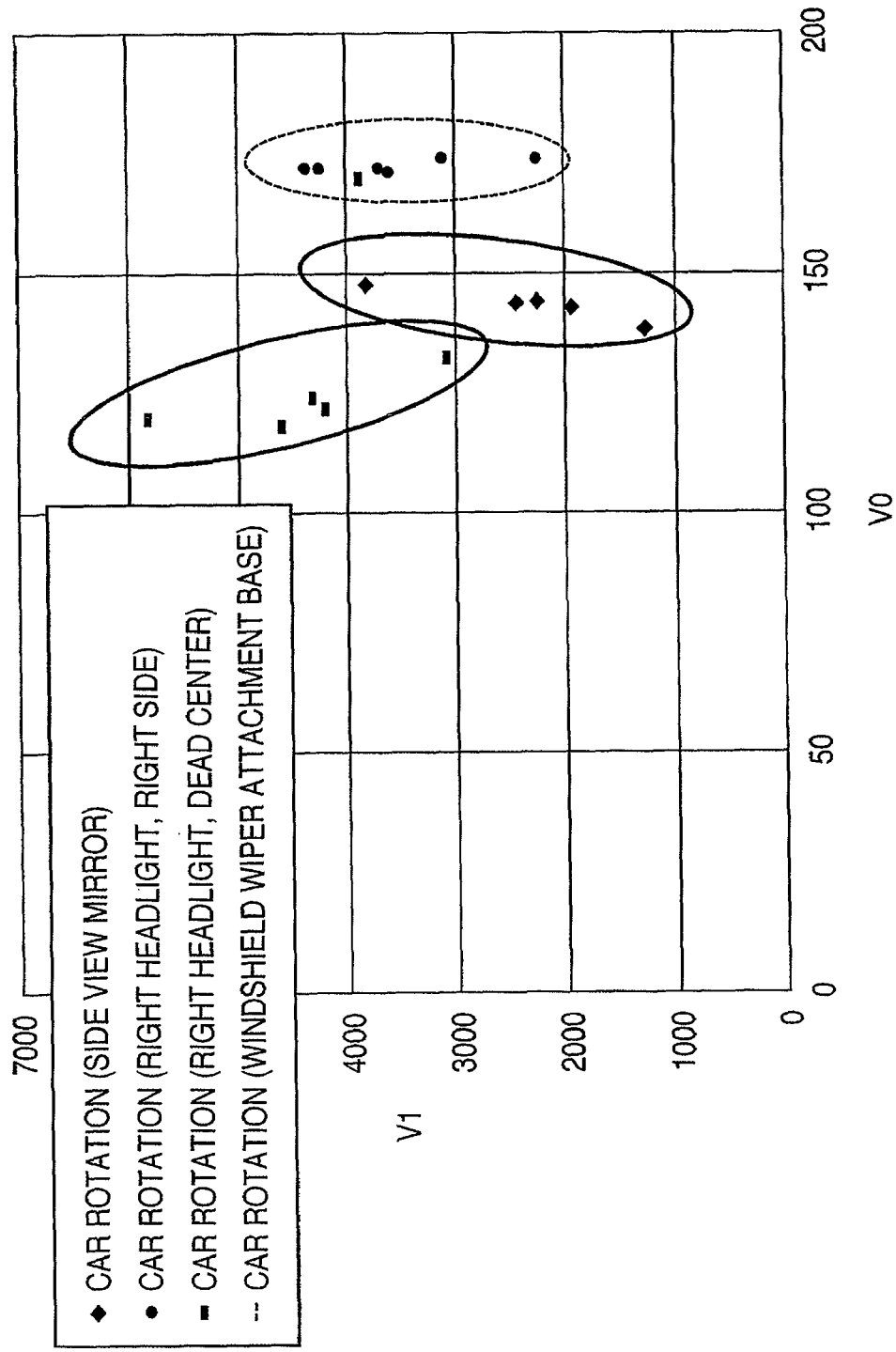
FIG. 8 depicts a fluctuation of a rotational invariant feature amount.

As per the scatter diagram that is depicted in FIG. 8, the distribution of the feature amount varies even with regard to a common local feature point. Accordingly, it is not possible to accurately compare a distance between the feature points without taking the distribution into account when computing the distance. Specifically, such a computation involves adopting the Mahalanobis distance in order that the distribution becomes a multidimensional normalized distribution, or simply normalizing with a value that is divided by the variance of the feature amount, and deriving the distance thereupon.

Figure 9:
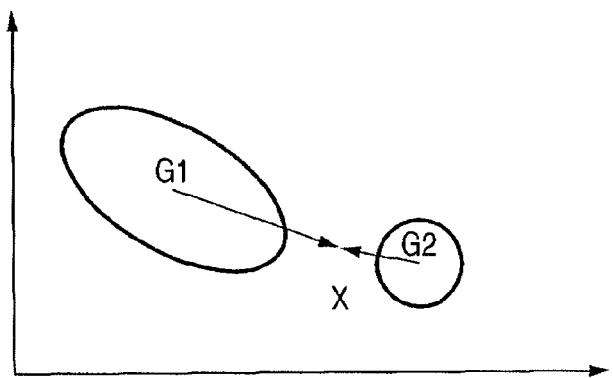
FIG. 9 depicts a distribution within a multidimensional feature space.

An instance of employing the Mahalanobis distance is described hereinafter. Whereas, with regard to the scatter diagram that is depicted in FIG. 8, a G2, which includes a shorter Euclidean distance than a G1, is closer to a point X, such as is depicted in FIG. 9, the G1 is closer than the G2 with regard to the normalized distance that takes into account the distribution of the fluctuation feature amount.

A set wherein a focus feature point of the query image 201 is scattered within a feature amount space of a number of dimension k that is obtained after the rotation, the enlargement, or the reduction, of the query image 201, is thereby selected as a single population. In the present example, a quantity of the feature point will be signified by N, and the population will be distinguished by a population ID: j.

An average of the population j will be treated as $\mu j = (\mu 1j, \mu 2j, \ldots, \mu pj)'$ ($j = 1, 2, \ldots, k$), an observed value will be treated as $X = (X1, X2, \ldots, Xp)'$, a variance-covariance matrix of the population j will be treated as $\Sigma j$, and an inverse matrix thereof will be treated as $\Sigma j^{-1}$. Thus, a distance dj from a population of X is represented by the following equation:

$$dj^2 = (X - \mu j)' \mu j^{-1} (X - \mu j) \qquad (8)$$

Figure 10:
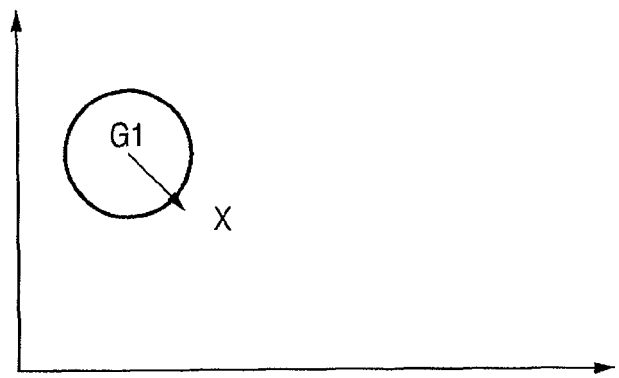
FIG. 10 depicts performing a multidimensional distribution conversion in a group of a feature point that is within the multidimensional feature space.
Figure 11:
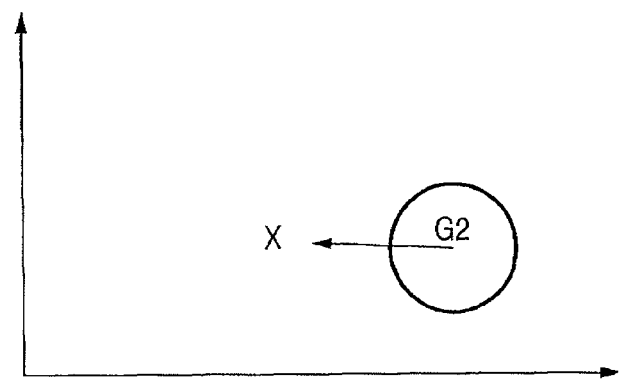
FIG. 11 depicts performing a multidimensional distribution conversion in a group of a feature point that is within the multidimensional feature space.

An operation of the equation is described with a conceptual illustration that is depicted in FIG. 10 and FIG. 11. The operation begins by performing a multidimensional normalization distribution on the feature amount distribution of each respective feature point, by way of the Mahalanobis distribution, in order that the distribution is unified. Applying the inverse matrix to the variance-covariance matrix thereby results in the distribution that is depicted in FIG. 10 and FIG. 11, and it becomes apparent that, whereas, the G2 is closer to the point X than the G1 with regard to the Euclidean distance, the G1 is closer than the G2 with regard to the normalized distance that takes into account the distribution.

The inverse matrix of the variance-covariance matrix and the average, i.e., a centroid, thereof, which is used to compute the Mahalanobis distance for the local feature point that is passed from the local feature amount computation unit 205, is stored.

In such a circumstance, it would also be possible not to employ the preceding operation with regard to the feature point that includes a particularly wide ranging distribution. As an example, the larger a covariance value of each respective item of the variance-covariance matrix, the wider the distribution, as per the depiction herein, and by a threshold value processing thereof, it is possible to detect the feature point with a particularly wide ranging distribution. It is to be understood that it would be permissible as well to presume that the larger a norm of the variance-covariance matrix, the wider the distribution.

Whereas an example has been described according to the first embodiment that treats the angle of rotation when inspecting the fluctuation feature amount as being 45 degrees, and that carries out the inspection only when the image is rotated by 45 degrees, it is to be understood that it would be permissible to carry out the rotation inspection at a multiple of t degrees, ranging from zero degrees to n degrees, for instance, wherein t is a predetermined value that satisfies the inequality $0 < t < n$. It would also be permissible to instead perform the rotation inspection in a series that repeats in a 20% interval starting at 90 degrees until the angle is less than or equal to t degrees, rather than carrying out the rotation inspection at every interval of t degrees, and promote an elimination of the feature point with the significant degree of fluctuation by evaluating the fluctuation feature amount with regard to each respective feature point.

Returning to FIG. 5, in step S507, the image similarity computation unit 207 compares the feature amount that is passed to the image similarity computation unit 207 from the feature amount distribution inspection unit 206 with the feature amount that is registered with the image feature database 107. The comparison thereof is carried out for each respective registration image that is registered with the image feature database 107, and the degree of similarity is computed for each respective registration image as a result of the comparison thereof. The method of computing the degree of similarity will be described in further detail later.

In step S508, the image similarity computation unit 207 associates the degree of similarity thus computed with the image that is the source of the computation of the degree of similarity, creates a retrieval result list, and sorts the degree of similarity in descending order therein. Thereafter, the image with the highest degree of similarity, and the degree of similarity of the image, is outputted as the retrieval result 208 in the sorted order.

Method of Computing the Degree of Similarity

In the present example, the local feature amount that is passed from the feature amount distribution inspection unit 206 is treated as Vs, and a coordinate that is associated with this local feature amount as S(x, y). The local feature amount that is present within an image R that is registered with the image feature database 107 as Vq, and a coordinate that is associated with this local feature amount as Q(x', y').

Figure 6:
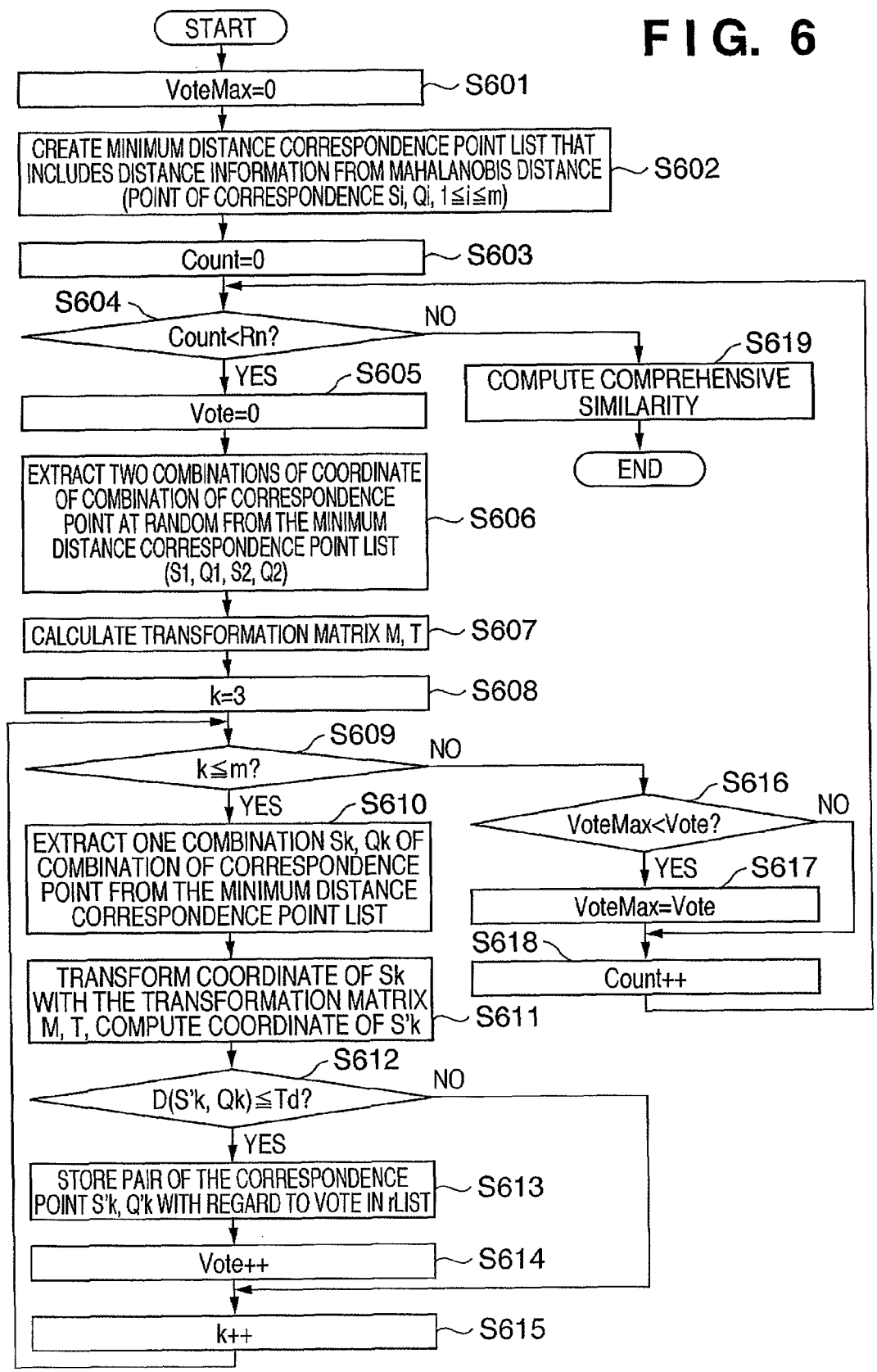
FIG. 6 is a flowchart that depicts a process of computing a degree of similarity according to the first embodiment.

FIG. 6 is a flowchart that depicts a sequence of computing the degree of similarity according to the first embodiment. The computation of the degree of similarity is performed by a voting process, i.e., a counting process. The number of the vote is equivalent to the degree of similarity. In step S601, a variable VoteMax, which represents a maximum number of votes, is initialized to zero. The maximum number of votes is a maximum number of votes that is obtained in the course of performing a plurality of an iteration of a vote. In step S602, a calculation is made of all of a combination of a feature amount distance between the Vq and the Vs, and a minimum distance correspondence point list is created. When deriving the minimum distance correspondence point, first, the inverse matrix of the variance-covariance matrix and the average, i.e., the centroid, thereof, which is used to compute the Mahalanobis distance that is stored for each respective local feature point of the query image, is employed to derive the distance, in accordance with equation (8). A minimum distance correspondence point list is created that includes the distance thus derived and the variance-covariance inverse matrix.

Put another way, the combination, i.e., the correspondence point, of the Vq and Vs wherein the distance between the feature amount thus calculated is less than or equal to a threshold value Tv and is a minimum distance, is extracted and registered with the minimum distance correspondence point list.

Hereinafter, with regard to a correspondence point k that is registered with the minimum distance correspondence point list, the local feature amount of the correspondence point will be disclosed as a Vq(k) and a Vs(k), respectively. The local feature point that is made to correspond to the Vq(k) and the Vs(k) will hereinafter be disclosed as a Qk and an Sk, respectively, and a coordinate thereof will be disclosed in combination with an index, such as a Qk(x' k, y' k), and an Sk(xk, yk). The number of combinations that is recorded with the minimum distance correspondence point list that is created in step S602 will hereinafter be treated as m combinations.

Relating to the distance between the feature amount being the threshold value Tv, it is natural to conceive of a method of performing a preferable threshold value process by increasing the threshold value the wider the distribution of the feature amount of the focus feature point of the query image, and reducing the threshold value the narrower the distribution of the feature amount of the focus feature point of the query image. As an example, a method that deals with a threshold value that is inversely proportional to the norm of the variance-covariance matrix would be simple to apply herein.

In step S603, a variable Count, which represents the number of iterations of the process of computing the degree of similarity, is initialized to zero. In step S604, a determination is made as to whether or not the iteration count number Count exceeds a predetermined maximum process iteration number Rn. In the present circumstance, if the iteration count number Count exceeds the predetermined maximum process iteration number Rn, the process proceeds to step S619, wherein the maximum number of votes VoteMax is outputted, and the process terminates.

If the iteration count number Count does not exceed the predetermined maximum process iteration number Rn, the process proceeds to step S605, wherein a variable Vote, which represents a number of votes, is initialized to zero. In step S606, two combinations of the coordinate of the correspondence point is extracted at random from the minimum distance correspondence point list. In the present example, the coordinate thus extracted will be expressed as Q1(x' 1, y' 1), S1(x1, y1), and Q2(x' 2, y' 2), S2(x2, y2). In step S607, it is hypothesized that the Q1(x' 1, y' 1), S1(x1, y1), and Q2(x' 2, y' 2), S2(x2, y2) that were extracted in step S606 satisfy a transformation that is depicted in equation (9), shown below, and a variable a to f within the equation (9) is derived thereby.

It is to be understood that, in the step S607 that is depicted in FIG. 6, a matrix that is configured of the variable a to d is depicted as M, and a matrix that is configured of the variable e to f is depicted as T.

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} \qquad (9)$$

In the present example, only a similarity transformation will be considered according to the first embodiment, for the purpose of simplification. Under such conditions, the equation (9) may be rewritten as equation (10).

$$\begin{pmatrix} x'_k \\ y'_k \end{pmatrix} \begin{pmatrix} a & -b \\ b & a \end{pmatrix} \begin{pmatrix} x_k \\ y_k \end{pmatrix} + \begin{pmatrix} e \\ f \end{pmatrix} \qquad (10)$$

In this case, the variable a, b, e, and f are represented by equations (11) to (14), using symbols x' 1, y' 1, x1, y1, x' 2, y' 2, x2, y2:

$$a = \frac{(x_1 - x_2)(x'_1 - x'_2) + (y_1 - y_2)(y'_1 - y'_2)}{(x_1 - x_2)^2 + (y_1 - y_2)^2} \qquad (11)$$

$$b = \frac{(x_1 - x_2)(y'_1 - y'_2) - (y_1 - y_2)(x'_1 - x'_2)}{(x_1 - x_2)^2 + (y_1 - y_2)^2} \qquad (12)$$

$$e = \frac{(y'_1 - y'_2)(x_1 y_2 - x_2 y_1) - (x'_1 + x'_2)(x_1 x_2 + y_1 y_2) + x'_1(x_2^2 + y_2^2) + x'_2(x_1^2 + y_1^2)}{(x_1 - x_2)^2 + (y_1 - y_2)^2} \qquad (13)$$

$$f = \frac{(x'_1 - x'_2)(y_1 x_2 - y_2 x_1) - (y'_1 + y'_2)(y_1 y_2 + x_1 x_2) + y'_1(y_2^2 + x_2^2) + y'_2(y_1^2 + x_1^2)}{(x_1 - x_2)^2 + (y_1 - y_2)^2} \qquad (14)$$

In step S608, a feature point selection variable k is initialized to three, in order to select a point other than the two combinations of the point that was extracted at random from the minimum distance correspondence point list in step S606. In step S609, a determination is made as to whether or not the feature point selection variable k exceeds a number of the combination that is registered with the minimum distance correspondence point list m. In the present example, if the feature point selection variable k exceeds the number of the combination that is registered with the minimum distance correspondence point list m, the process proceeds to step S615 (to be described later). If the determination in step S609 finds that the feature point selection variable k does not exceed the number of the combination that is registered with the minimum distance correspondence point list m, the process proceeds to step S610.

In step S610, a point other than the two combinations of the point S1(x1, y1) and S2(x2, y2) that is extracted in step S606 is extracted from the minimum distance correspondence point list. The point thus extracted will be disclosed as Sk(xk, yk) according to the first embodiment.

In step S611, a coordinate Sk' (x'k, y'k) that is transformed from the coordinate Sk(xk, yk) is derived, using equation (10).

In step S612, a geometrical distance between the coordinate Sk(xk, yk) and the coordinate Sk' (x'k, y'k) is calculated with the Euclidean distance, and a determination is made as to whether or not the Euclidean distance is less than or equal to a threshold value Td. If the Euclidean distance is less than or equal to the threshold value Td, the process proceeds to step S613, wherein the corresponding correspondence point Sk', Qk with regard to the vote number Vote is stored. In step S614, the vote number Vote is incremented, and the process proceeds to step S615. If the Euclidean distance is greater than the threshold value Td, the process proceeds to step S615, without performing the process in step S613 or step S614. The feature point wherein the Euclidean distance is less than or equal to the threshold value Td is the feature point that is treated as being similar between the respective image.

In step S615, the feature point selection variable k is incremented, the process returns to step S609, and the preceding process repeats until the feature point selection variable k exceeds the number of the combination that is registered with the minimum distance correspondence point list m. Put another way, the sequence is repeated wherein another two combination of the point is extracted in step S606, the parameter variable a, b, e, and f of the equation (9) is derived in step S607, and the process from step S608 to step S612 is performed.

Following is a description of step S616, which is the process that is performed when it is determined in step S609 that the feature point selection variable k exceeds the number of the combination that is registered with the minimum distance correspondence point list m. In step S616, a value of the number of votes Vote is compared with a value of the maximum number of votes VoteMax, and if the value of the number of votes Vote is greater than the value of the maximum number of votes VoteMax, the process proceeds to step S617.

In step S617, the value of the maximum number of votes VoteMax is replaced with the value of the number of votes Vote, whereupon the iteration count number Count is incremented in step S618, and the process returns to step S604.

If it is determined in step S616 that the value of the number of votes Vote is less than or equal to the value of the maximum number of votes VoteMax, the process proceeds to step S618, wherein the iteration count number Count is incremented, and the process returns to step S604.

Whereas the description of the method of computing the degree of similarity considered only the similarity transformation according to the first embodiment, it would be possible as an alternative to deal with computing the degree of similarity by deriving a transformation matrix in step S607 that corresponds to an Affine transformation for example, or another geometrical transformation. As an example thereof, when applying the Affine transformation, it is presumed that the number of the combination of the coordinate of the correspondence point that is selected at random in step S606 is three. In step S607, it is presumed that equation (9) is used, rather than equation (10), and it would be permissible to use the three combination of the correspondence point that is selected in step S606, i.e., a total of six points, to derive the variable a to f.

Figure 7:
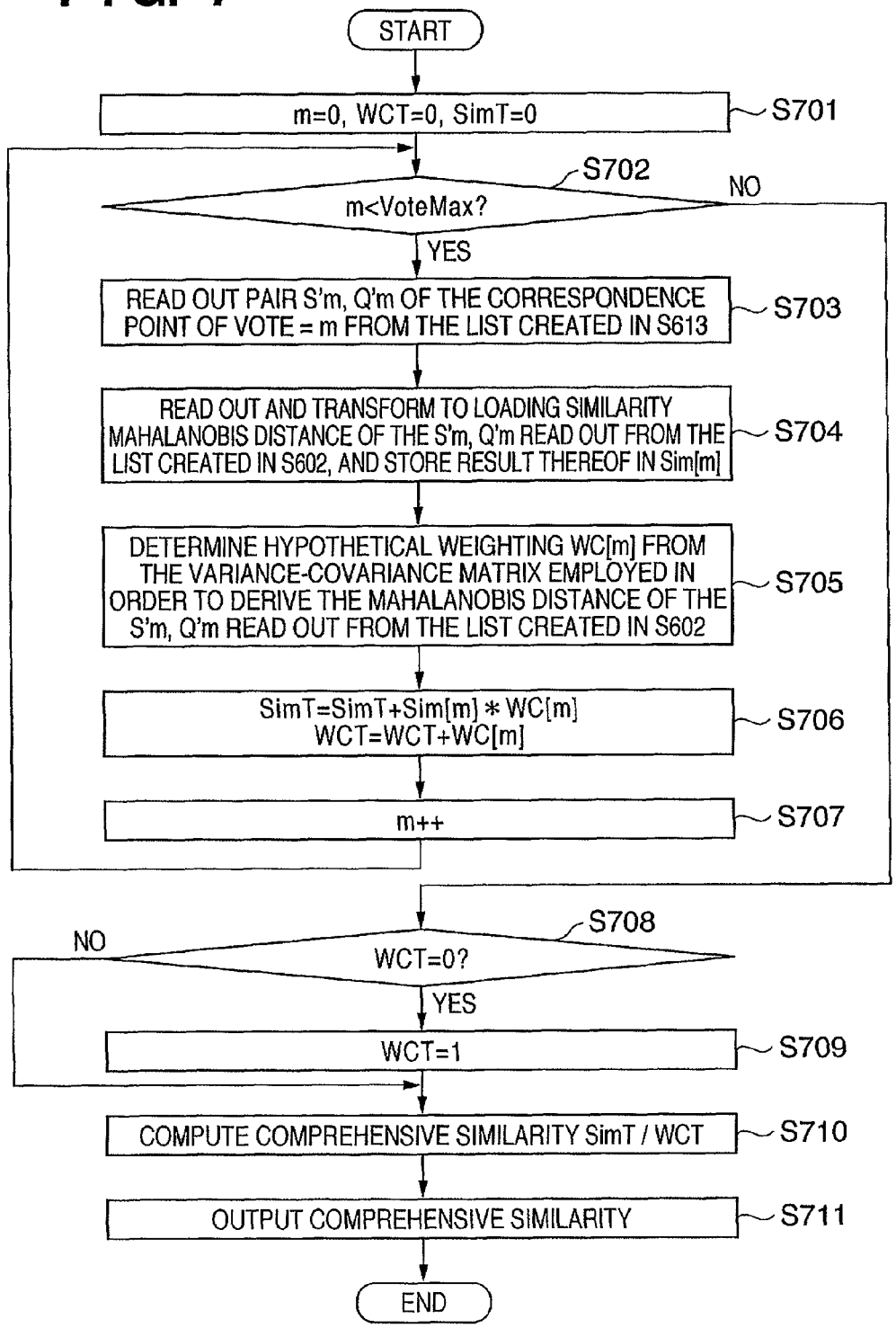
FIG. 7 is a flowchart that depicts a process of computing a comprehensive degree of similarity according to the first embodiment.

Following is a description of the process of computing a comprehensive degree of similarity in step S619, as depicted in FIG. 6, with reference to FIG. 7. FIG. 7 is a flowchart that depicts the process of computing the comprehensive degree of similarity according to the first embodiment.

In step S701, a serial number m of a pair of focus feature amounts is initialized to zero, a sum WCT of a weighting with regard to the degree of similarity that is associated with each respective feature amount is initialized to zero, and a cumulative degree of similarity SimT is initialized to zero.

In step S702, a determination is made as to whether or not a quantity of the pair of focus feature amounts is exhausted, and if the quantity of the pair of focus feature amounts is not exhausted, the process proceeds to step S703, wherein a pair S'm, Q'm of the correspondence point of a Vote=m is read out from a list that is created in step S613.

Figure 12:
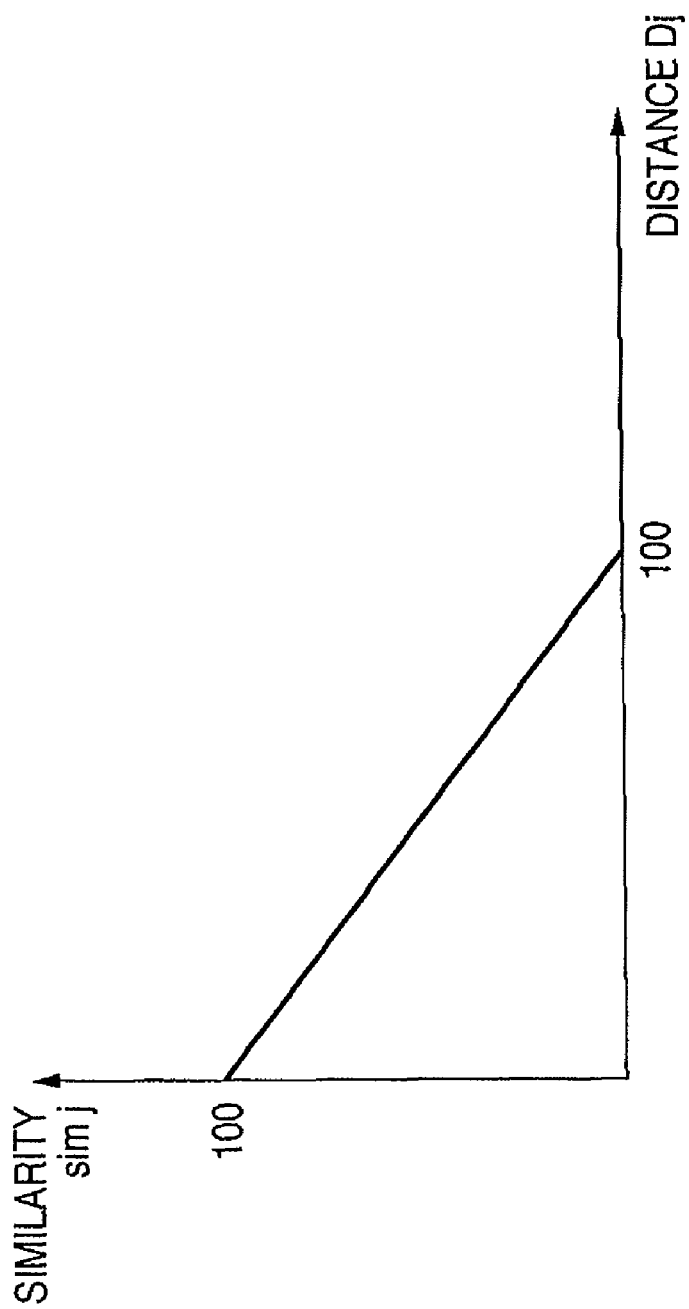
FIG. 12 depicts a function that transforms a similarity distance into the degree of similarity.

In step S704, a Mahalanobis distance of the S'm, Q'm that is read out from the list that is created in step S602 is transformed to a loading degree of similarity, and stored in an Sim[m]. In the present circumstance, it is presumed that, as a function that transforms the distance into the degree of similarity, the degree of similarity is 100% when the distance is zero, such as is depicted in FIG. 12, and it would be permissible to employ a transformation function thereof that includes a feature wherein, as the distance increases, the degree of similarity decreases monotonically. FIG. 12 depicts an example of a function that transforms a similarity distance into the degree of similarity.

In step S705, a hypothetical weighting WC[m] is determined from the variance-covariance matrix that is employed in order to compute the Mahalanobis distance of the S'm, Q'm that is read out from the list that is created in step S602. With regard to the weighting thereof, it would be permissible to employ (for example) an average of an absolute value of each respective item of the variance-covariance matrix that is employed when deriving the Mahalanobis distance to perform the computation thereof.

For instance, when the average variance is large, the distribution thereof expands, which means that, put another way, the degree of reliability of the degree of similarity for the distance is low. Accordingly, when deriving the comprehensive degree of similarity of the image proper with a weighted linear sum of the degree of similarity of each respective feature point, it is incumbent that the weighting of the degree of similarity by the feature point that includes the large variance should be small. Thus, it would be possible to compute the comprehensive degree of similarity of the image proper with a higher degree of reliability by treating a reciprocal of the average of the absolute value of each respective item of the variance-covariance matrix thus derived as the hypothetical weighting, and normalizing the hypothetical weighting thus computed by dividing the hypothetical weighting thereof by a total weighting.

In step S706, a partial sum SimT of the weighted linear sum computed thus far is derived, and the total weight WCT=WCT+WC[m] is computed as well. In step S707, m is incremented, and the process proceeds to a next feature point pair.

In step S702, if no more pairs of feature points to be processed is present, the process proceeds to step S708, wherein a determination is made as to whether or not the WCT is zero, and if the WCT is zero, the process proceeds to step S709, wherein a value of the WCT is reset to 1, and the process proceeds to step S710. The present process is an exception, in order to avoid performing a division by zero in step S710 (to be described hereinafter), because it is presumed that the variance is zero when the feature amount from the reduction or the rotation is not present.

If, on the other hand, the WCT is determined not to be zero in step S708, the process proceeds to step S710, wherein the comprehensive degree of similarity of the image proper as the hypothetically weighted linear sum is normalized by dividing by a sum total of the weighting. Finally, in step S711, the comprehensive degree of similarity of the image proper is outputted, and the process terminates.

The image retrieval apparatus according to the first embodiment is configured so as to inspect the fluctuation of the local feature amount that is computed from the query image, and not to use a local feature amount that includes a large fluctuation when performing the retrieval, and it is thereby possible to keep any decline in the precision of the retrieval under control.

Second Embodiment

Following is a detailed description of a second embodiment according to the present invention, with reference to the attached drawings. A Mahalanobis distance is employed with regard to a process of computing a similarity distance between an image according to the second embodiment, and another component thereof, is similar to the first embodiment. An apparatus configuration according to the second embodiment is similar to the apparatus configuration according to the first embodiment, and a description thereof will thus be omitted.

The process of employing the Mahalanobis distance to compute the similarity distance between the image, and of computing a comprehensive degree of similarity thereby, is described hereinafter with reference to FIG. 13.

Figure 13:
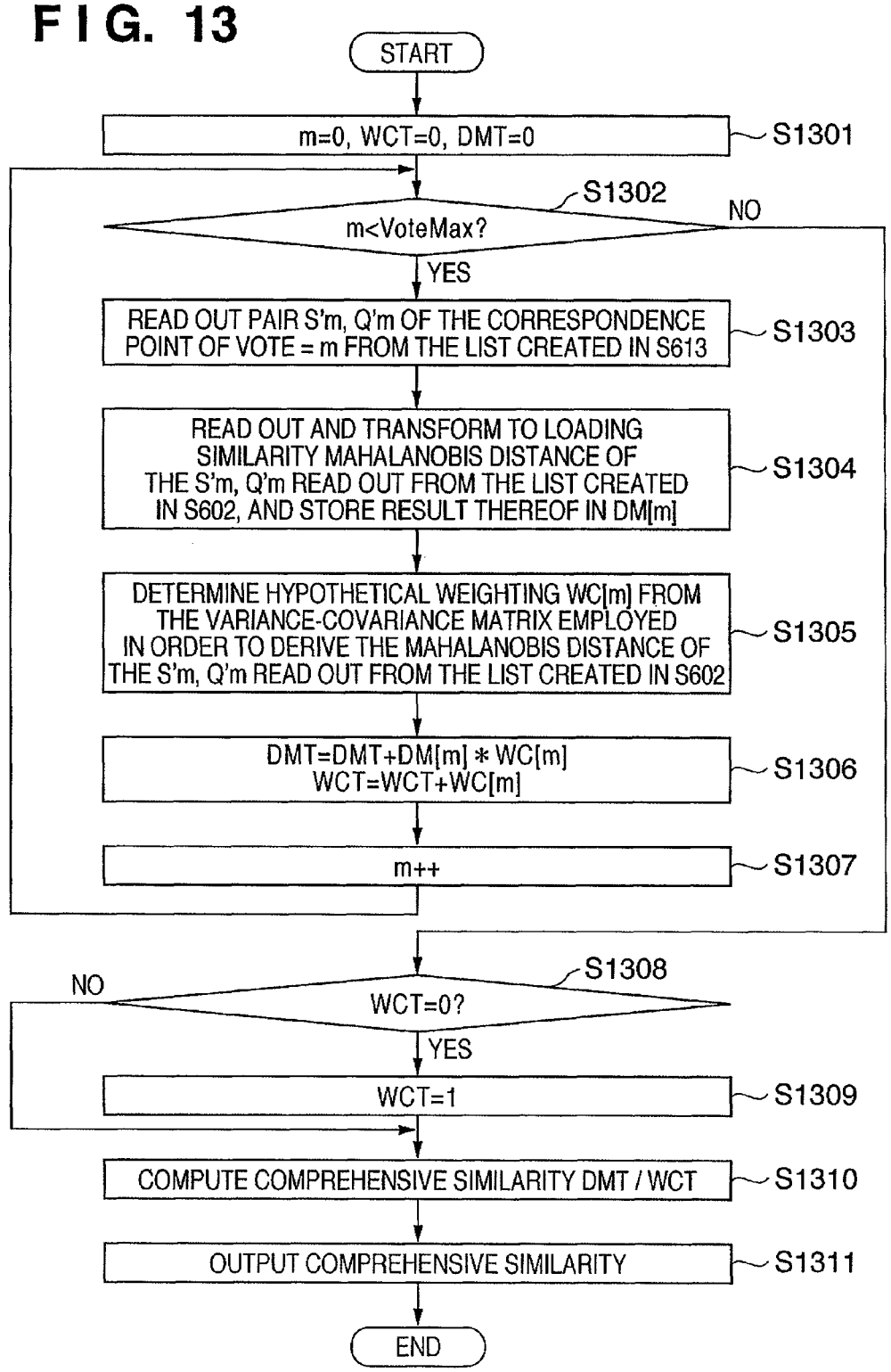
FIG. 13 is a flowchart that depicts a process of computing the comprehensive degree of similarity according to a second embodiment.

FIG. 13 is a flowchart that depicts the process of computing the comprehensive degree of similarity according to the second embodiment. In step S1301, a serial number m of a pair of focus feature amounts is initialized to zero, a sum WCT of a weighting with regard to the degree of similarity that is associated with each respective feature amount is initialized to zero, and a cumulative similarity distance DMT is initialized to zero.

In step S1302, a determination is made as to whether or not a quantity of the pair of focus feature amounts is exhausted, and if the quantity of the pair of focus feature amounts is not exhausted, the process proceeds to step S1303, wherein a pair S' m, Q' m of the correspondence point of a Vote=m is read out from the list that is created in step S613.

In step S1304, a Mahalanobis distance of the S' m, Q' m that is read out from the list that is created in step S602 is read out and stored in a DM[m].

In step S1305, a hypothetical weighting WC[m] is determined from the variance-covariance matrix that is employed in order to derive the Mahalanobis distance of the S' m, Q' m that is read out from the list that is created in step S602. With regard to the weighting thereof, it would be permissible to employ, for example, an average of an absolute value of each respective item of the variance-covariance matrix that is employed when deriving the Mahalanobis distance to perform the computation thereof.

For instance, when the average variance is large, the distribution thereof expands, which means that, put another way, the degree of reliability of the degree of similarity for the distance is low. Accordingly, when deriving the comprehensive degree of similarity of the image proper with a weighted linear sum of the degree of similarity of each respective feature point, it is incumbent that the weighting of the distance by the feature point that includes the large variance should be small. Thus, it would be possible to compute the comprehensive degree of similarity of the image proper with a higher degree of reliability by treating a reciprocal of the average of the absolute value of each respective item of the variance-covariance matrix thus derived as the hypothetical weighting, and normalizing the hypothetical weighting thus computed by dividing the hypothetical weighting thereof by a total weighting.

In step S1306, a partial sum DMT of the weighted linear sum computed thus far is derived, and the total weight WCT=WCT+WC[m] is computed as well. In step S1307, m is incremented, and the process proceeds to a next feature point pair.

In step S1302, if no more pairs of feature points to be processed is present, the process proceeds to step S1308, wherein a determination is made as to whether or not the WCT is zero, and if the WCT is zero, the process proceeds to step S1309, wherein a value of the WCT is reset to 1, and the process proceeds to step S1310. The present process is an exception, in order to avoid performing a division by zero in step S1310 (to be described later), because it is presumed that the variance is zero when the feature amount from the reduction or the rotation is not present.

If, on the other hand, the WCT is determined not to be zero in step S1308, the process proceeds to step S1310, wherein the comprehensive distance of the image proper as the hypothetically weighted linear sum is normalized by dividing by a sum total of the weighting. Finally, in step S1311, the comprehensive distance of the image proper is outputted, and the process terminates.

Whereas the fluctuation of the feature amount as a combination of the reduction and the rotation is derived according to the first and the second embodiment, it would be possible for a user to perform either the rotation, the enlargement, or the reduction, or else to perform the combination of the rotation with the enlargement or the reduction, and to derive the distribution in accordance with an instruction thereof.

It is to be understood that it would be permissible to apply the present invention to a system that is configured from a plurality of devices, such as a host computer, an interface device, a reader, and a printer, for instance, as well as to an apparatus that is formed from a single device, such as a multifunction device or a fax machine, for instance.

A recording medium whereupon is recorded a program code (software) that implements the function according to the embodiment is supplied to either the system or the apparatus, whereupon a computer, i.e., a CPU or an MPU, of the system or the apparatus loads and executes the program code that is stored upon the recording medium. It is to be understood that the objective according to the present invention is achieved thereby.

In such a circumstance, the program code itself that is loaded from the recording medium implements the function according to the embodiment, and the recording medium that stores the program code configures the present invention.

It would be permissible to employ, for instance, a floppy disk, a hard drive, an optical disc, a magneto-optical disk, a CD-ROM, a CD-R, a magnetic tape, a nonvolatile memory card, or a ROM as the recording medium for supplying the program code.

A configuration whereby the function according to the embodiment is implemented by the compute executing the program code that is loaded from such a recording medium would also be conceivable. In such a circumstance, an embodiment wherein an operating system or other software that is running upon the computer performs the actual processing, either whole or in part, in accordance with an instruction of the program code, and the function according to the embodiment being implemented by the processing thereof, would also be within the scope of the present invention.

A configuration whereby the program code that is loaded from the recording medium is written to a memory that is built into an extension board that is installed into the computer, or an extension unit that is connected to the computer, is also conceivable. In such a circumstance, it would be permissible for a CPU or other hardware that is built into the extension board or the extension unit to perform the actual processing, either whole or in part, in accordance with the instruction of the program code, and the function according to the embodiment being implemented by the processing thereof.

According to the embodiments described herein, it would be possible to obtain a result of a calculation of a degree of similarity with regard to a feature point within a image wherein a degree of precision of the calculation of the degree of similarity between the image increases and is close to an intuition of a user thereof, even when an enlargement, a reduction, a rotation, or a combination thereof is present with regard to the image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-130901, filed May 16, 2007, which is hereby incorporated by reference herein in its entirety.

What is claimed is:

1. An image processing apparatus, comprising:
an extraction unit configured to extract a plurality of feature points from an inputted query image;
a computation unit configured to compute respective feature amounts for each of the plurality of feature points;
an estimation unit configured to estimate a fluctuation distribution of the respective feature amounts computed according to transformation of the inputted query image; and
a retrieval unit configured to retrieve an image similar to the inputted query image from among a plurality of stored images, based on a weighted distance of each of the feature points of the computed feature amounts of the inputted query image, wherein each weighted distance is computed for the respective feature point of the inputted query image according to magnitude of fluctuation of the respective feature amount in the estimated fluctuation distribution.

2. The image processing apparatus according to claim 1, wherein the extraction unit extracts a feature point having a local feature amount which is robust with regard to a rotation.

3. The image processing apparatus according to claim 1, wherein the distance is normalized using a variance or a Mahalanobis distance.

4. The image processing apparatus according to claim 1, wherein a degree of similarity between the inputted query image and the stored images is computed based on a linear sum or a weighted linear sum in the normalized distance between the feature points.

5. The image processing apparatus according to claim 1, wherein a larger weighting is added to a feature amount having a smaller variance, as compared to weightings added to other feature amounts having variances larger than the variance of the feature amount.

6. An image processing apparatus as claimed in claim 1, in which the similar image is the most similar image from the plurality of stored images.

7. An image retrieval method, comprising:
extracting a plurality of feature points from an inputted query image;
computing respective feature amounts for each of the plurality of feature points;
estimating a fluctuation distribution of the respective feature amounts computed according to transformation of the inputted query image; and
retrieving an image similar to the inputted query image from among a plurality of images stored in a storage device, based on a weighted distance of each of the feature points of the computed feature amounts of the inputted query image, wherein each weighted distance is computed for the respective feature point of the inputted query image according to magnitude of fluctuation of the respective feature amount in the estimated fluctuation distribution.

8. A non-transitory machine readable recording medium retrievably storing a program which when loaded into a computer and executed performs an image retrieval method, the method comprising:
extracting a plurality of feature points from an inputted query image;
computing respective feature amounts for each of the plurality of feature points;
estimating a fluctuation distribution of the respective feature amounts computed according to transformation of the inputted query image; and
retrieving an image similar to the inputted query image from among a plurality of images stored in a storage device, based on a weighted distance of each of the feature points of the computed feature amounts of the inputted query image, wherein each weighted distance is computed for the respective feature point of the inputted query image according to magnitude of fluctuation of the respective feature amount in the estimated fluctuation distribution.

* * * * *